Oct. 12, 1971  R. SCHEIBLING  3,611,492
EXTRUSION NOZZLE FOR THE FORMATION OF MULTILAYER BANDS
Filed Oct. 30, 1969  3 Sheets-Sheet 1

Robert Scheibling
INVENTOR.

BY

Karl F. Ross
Attorney

United States Patent Office 3,611,492
Patented Oct. 12, 1971

3,611,492
EXTRUSION NOZZLE FOR THE FORMATION OF MULTILAYER BANDS
Robert Scheibling, Cap d'Ail, France, assignor to Siamp-Cedap, Monaco
Continuation-in-part of application Ser. No. 798,404, Feb. 11, 1969. This application Oct. 30, 1969, Ser. No. 872,486
Claims priority, application Germany, Oct. 9, 1969, P 19 50 963.8
Int. Cl. B29f 3/04
U.S. Cl. 18—13 P                                     2 Claims

ABSTRACT OF THE DISCLOSURE

An extrusion nozzle for the formation of multilayer bands wherein a pair of resiliently deflectable lips flank each of a pair of passages merging together at the outlet of the nozzle and joining respective inner streams of extruded material passing through the inner passages. The lips are adjusted by screws operating against the inherent resiliency of the metal forming the lips.

---

This application is a continuation-in-part of application Ser. No. 798,404, filed Feb. 11, 1969.

My present invention relates to a wide-slot nozzle structure with the formation of multilayer bands, preferably by extrusion and, more particularly, to a device for forming one or more layers in superimposed relationship to produce a band emerging from the nozzle structure.

It has already been proposed to provide an extrusion nozzle arrangement in which a pair of mutually convergent channels are formed in a metallic body and communicate with respective supply sources of layer-forming material; the latter is extruded along the respective generally flat channel to the mouth of the nozzle where the streams emerge in superimposed layers to form a two-layer band extending over the full width of the apparatus and, therefore, the entire length of the nozzle structure or the slot-like orifice thereof.

Between the two channels there is formed a separating body or core in the form of a generally wedge-shaped, forwardly converging tongue which cooperates with a pair of resiliently deflectable lips, also extending the full length of the outlet aperture of the nozzle, and spaced from the tongue to define the respective channels. This spacing is adjustable by screw devices designed to work against the inherent resiliency of the lips and thereby force the latter closer to the tongue when the thickness of the layer is to be reduced. Conversely, the lips may be resiliently deflectable to increase their spacing from the tongue and thereby increase the width of the channel and the thickness of the layer formed.

Such devices have been found to be effective in the formation of two-layer bands by continuous extrusion, but are not capable of the production of multilayer bands, i.e. bands having three or more layers.

It is, therefore, the principal object of the present invention to provide an improved nozzle arrangement for forming substantially continuous multilayer bands, i.e. bands having three or more layers and preferably bands with four layers.

Another object of the invention is to provide a nozzle structure of economical construction, low cost and relatively little tendency toward breakdown, which nevertheless permits adjustment of the individual layer thickness in the formation of multilayer sheets or bands.

Yet a further object of this invention is to provide a nozzle structure of the general character described which operates more efficiently and effectively than earlier nozzles, and also permits a simple adjustment of the layer thicknesses.

These objects and others which will become apparent hereinafter are obtained in accordance with the present invention in a wide nozzle structure, especially for the extrusion of thermoplastic materials and other synthetic resins and/or resins of the same or different compositions, which comprises a generally wedge-shaped tongue spaced slightly rearwardly from but converging in the direction of the slot-like nozzle mouth and defining with a pair of flanking members which may be formed unitarily (i.e. in one piece) and monolithically from the metal of the tongue or assembled from several parts, the flanking members being disposed alongside the tongue so as to form a pair of extrusion channels merging with an additional pair of channels upstream of the slot-like nozzle mouth. While two "inner" channels have been described here, it will be apparent that a single "inner" channel may also be employed.

The present invention provides between the or each inner channel and the intersecting outer channel an inner wedge-shaped lip forming a partition between the channel branches upstream of a trunk channel into which each inner and outer channel opens.

The main channel portions have a width or gauge which is adjustable by a pair of resiliently deflectable lips affixed to the flanking members of the nozzle and adapted to be deflected by screw means so as to increase or decrease the width of the gap and, therefore, the thickness of the layer formed.

The inner lips, moreover, may be resiliently deflectable toward and away from the tongue to adjust the width of the channels formed therealong.

In other words, the present invention relates to a wide-slot nozzle for the formation of multilayer bands and the like, preferably of synthetic resin and especially different synthetic resins in the several layers, provided with a plurality of forwardly converging channels for the different materials communicating with one another at the extrusion slot. At least on one side of each channel there is provided a resiliently deflectable lip which may be biased against the inherent resiliency of the metal body forming the nozzle to increase or decrease the channel width.

According to an important feature of this invention, substantially independent control of the thicknesses of each of the layers emerging from the nozzle is obtainable. I have discovered, most surprisingly, that when the inner lips mentioned earlier define the junction between the flow channel extending along the stationary tongue (inner channels or branches) and the outer channel formed with the nozzle body (and preferably with the outer lips), such that the inner and outer channels on each side of the tongue merge just ahead of the respective wedge-shaped inner lip, it is possible to control the thickness of the inner layer (derived from the inner channel) with the aid of the outer lip, while the inner lip may be used to control the outer layer derived from the outer channel without substantial modification of the thickness of the inner layer, in spite of the fact that the inner lip forms guide surfaces common to both the inner and the outer channels.

According to this feature of the invention, in the mean or normal position of the inner lip on each side of the tongue, the width of the outer channel is less than the width of the inner channel. Advantageously, the width of the outer channel may be between one-quarter and two-thirds (preferably one-half) of the width of the outer channel. For reasons which are not entirely clear but appear to relate to the flow characteristics of thermoplastic synthetic resins through extrusion nozzles in flat layers, a modification of the width of the outer channel by the inner lip allows control of the thickness of the outer layer through a wide range (in terms of the ratio of the dimension change to the original or mean layer thickness) without a material alteration of the thickness of the inner layer, albeit the inner layer passes from the inner channel between this inner lip and the tongue.

According to another feature of this invention, the inner and outer channels join one another ahead of the inner lip, i.e. downstream thereof, and upstream of the discharge slot of the nozzle to form a trunk channel between the respective outer layer and one of the converging surfaces of the tongue. When the outer lip is then adjusted, i.e. moved toward or away from the surface of the tongue, it is found, again surprisingly, that the change in the width of the trunk channel does not alter the thickness of the outer layer but permits control of the thickness of the inner layer.

I have also found that the invention may be applied to a four-layer system in which two sets of inner and outer channels with the respective inner and outer lips can be provided on either side of the common tongue with the truck channels feeding together to the outlet slot. In this case, the band may be composed of four independently controllable layers each of a different synthetic resin material.

The above and other objects, features and advantages of the present invention will become more readily apparent from the following description, reference being made to the accompanying drawing in which.

Figure 4:
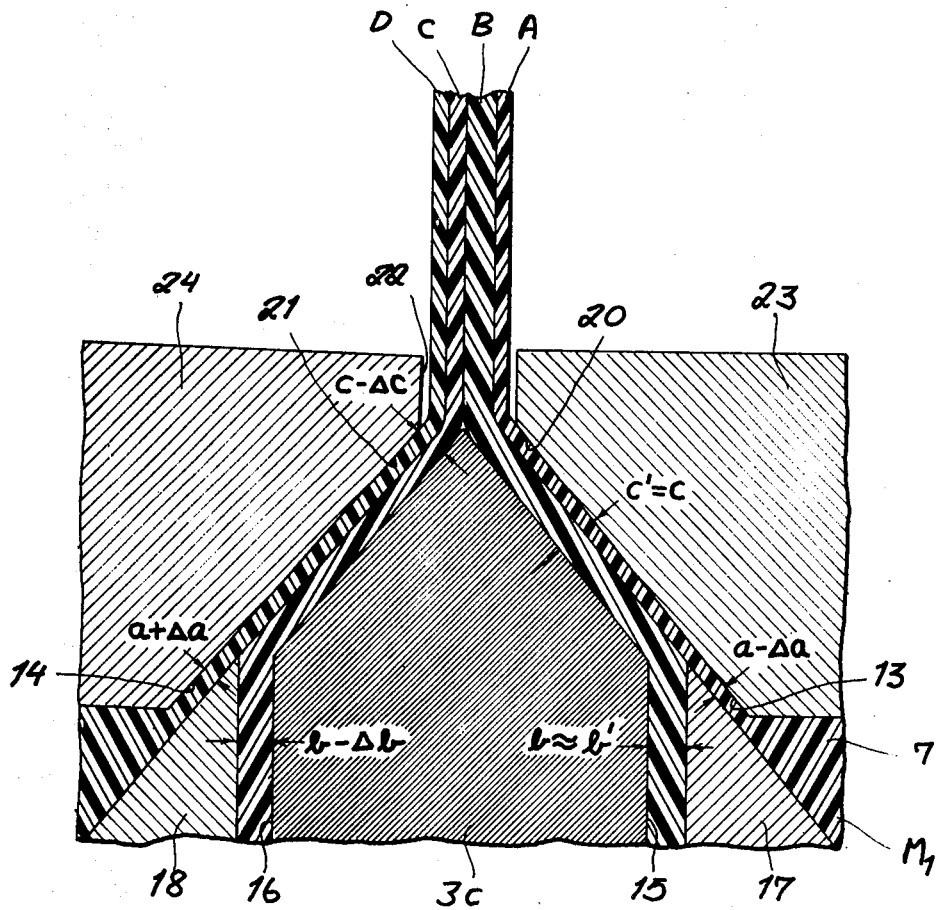
FIG. 4 is a view similar to FIG. 3 showing the nozzle with some of the lips displaced into off-normal adjusted positions.

In the drawing, I show a band-extrusion nozzle for the formation of a multilayer thermoplastic or other synthetic resin band as represented at 30 and composed of four layers A, B, C and D as shown in FIG. 4. While the nozzle of this invention has been described in conjunction with the extrusion of synthetic resins, it may be used for the formation of any continuous strip composed of one or more layers of a layer-forming material. In the present case it shall be assumed that four different synthetic resins are to be extruded to form a four-layer band, the synthetic resin material being fed under pressure to the nozzles via respective conduits 9, 10, 11 and 12.

Figure 2:
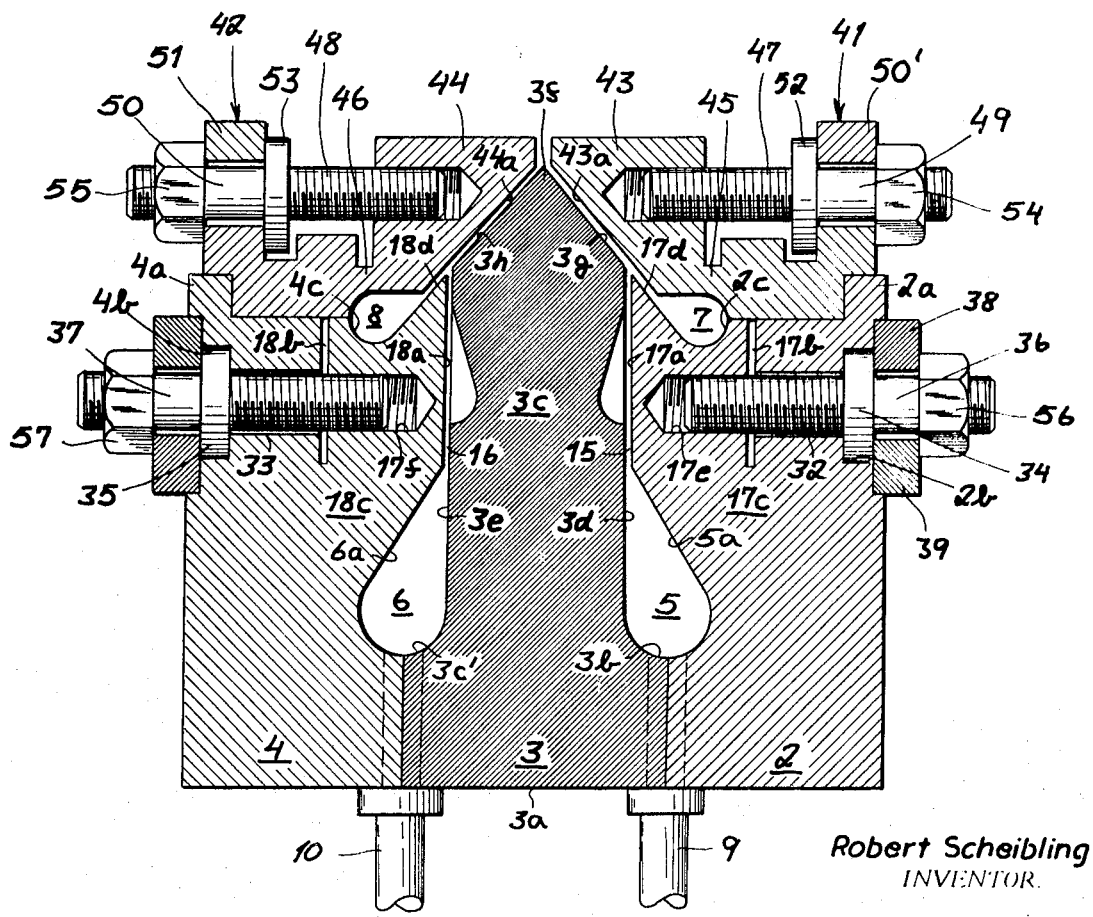
FIG. 2 is a cross section through the nozzle taken on line II—II of FIG. 1.

The nozzle structure basically comprises a body 31 consisting of three main blocks of generally flat configuration, but shown in section in FIG. 2. The central block 3 has a flange 3a at its end remote from the outlet 22 of the nozzle.

The forwardly facing shoulders 3b and 3c' of this flange are concave to define chambers 5 and 6, respectively, connected with the conduits 9 and 10 when the blocks 2–4 are assembled. Ahead of the flange 3a, the central block 3 is provided with a tongue 3c with generally planar flanks 3d and 3e lying parallel to one another and generally perpendicular to the flange 3 while running the full length of the nozzle as will be apparent from FIG. 1. At the free end of the tongue 3c, the tongue converges in a wedge structure 3f as defined by a pair of forwardly converging faces 3g and 3h with an apex angle between about 80 and 90° and disposed just downstream of the slot 22.

Each of the outer blocks 2 and 4 is formed with distribution chambers 5 and 6 which are of droplet cross-section and likewise run along the entire length of the slot 22 while forming flanks 5a and 6a which converge toward the flanks 3d 3e to form a constriction leading into the respective inner channels 15 and 16 of the device. While one wall of each of these channels is defined by the tongue 3c as described earlier, the other wall is defined by a face 17a or 18a of the lip formed on the blocks 2 and 4 by incisions 17b and 18b which render these lips resiliently deflectable at the narrow webs 17c and 18c joining the lips to the remainder of the bodies 2 and 4. Furthermore, each of these lips (inner lips) is of generally parallelogrammatic configuration with the flanks 5a and 6a at the upstream ends of the lips parallel to the flanks 17d and 18d at the downstream side. Consequently, the flanks 17d and 18d join the faces 17a and 18a at included angles of between 40 and 50° to define wedge-shaped members subdividing the inner channels 15 and 16 from the respective outer channels 20 and 21 (see FIG. 3). In general, therefore, the lips 17 and 18 have the configuration of feet.

To enable deflection of the inner lips, each of these lips is provided with an array of adjusting bolts or screws 32 and 33 respectively threaded into bores 17e and 17f in the lips 17 and 18. Overhanging each of these lips, is a ledge 2a, 4a of the respective block 2, 4 through which the bolts 32 and 33 passes. From FIG. 1, it is apparent that a multiplicity of bolts 32 or 33 is provided with the bolts in spaced-apart relation along the length of the nozzle and that these bolts lie in a common plane perpendicular to the direction of flow of the synthetic resin and the plane of tongue 3c.

Figure 1:
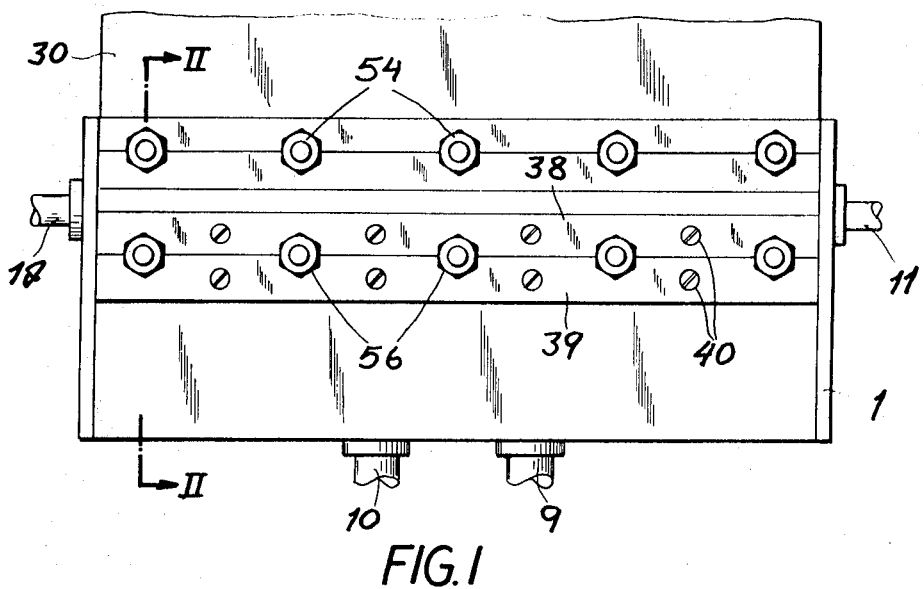
FIG. 1 is a plan view of a nozzle for the extrusion of multilayer synthetic resin bands.

Each of the bolts is provided with a flange 34, 35 rotatably received in a complementary recess 3b, 4b in the blocks 2 and 4, while a collar encircles the cylindrical necks 36, 37 as represented in FIG. 2. The collar consisting of two collar halves 38, 39 as shown in FIG. 1, is bolted to the respective body 2, 4 via the screws 40.

Figure 3:
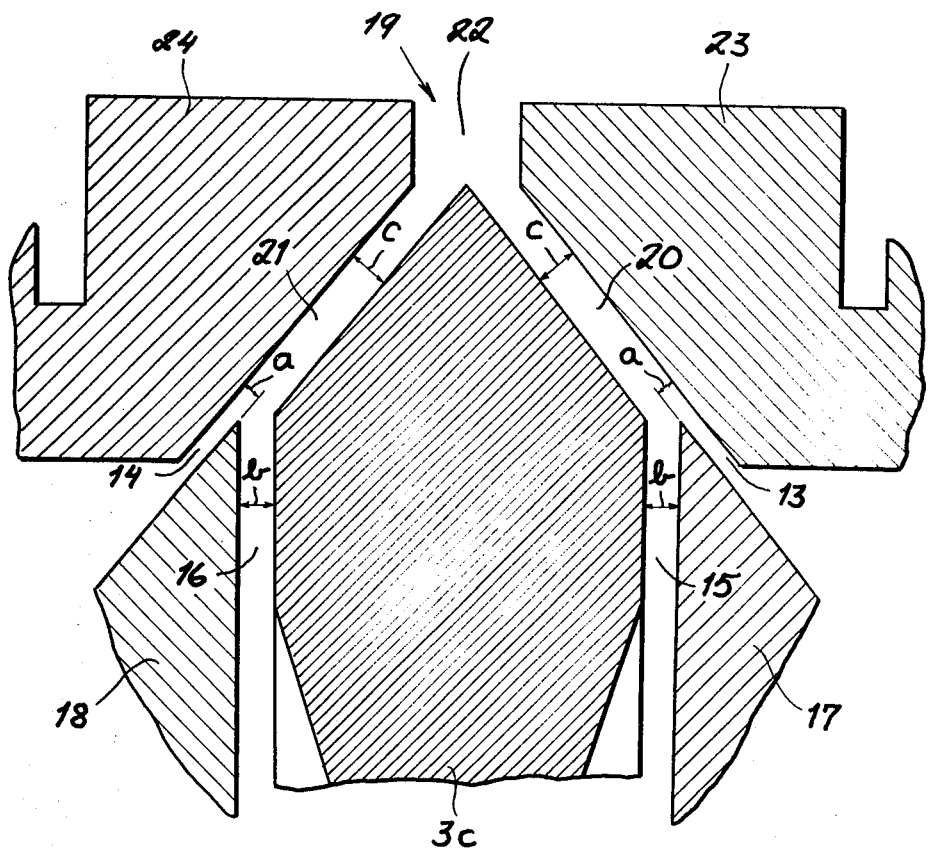
FIG. 3 is a detail view, drawn to enlarged scale and illustrating the arrangement of the channels according to this invention.

The forward faces of the bodies 2, 4 are formed with concavities 2c, 4c defining the distribution chambers 7 and 8 which are of the droplet cross section and feed the outer channels 13 and 14, respectively, as may be seen in FIG. 3. Chambers 7 and 8 are in part defined by the outer lip members 41 and 42. Each of these members is affixed to a respective ledge 2a, 4a and flanks the wedge-shaped portion of the tongue 3c protecting the lips 17 and 18 and possesses a respective resiliently deflectable lip 43, 44, held onto the remainder of the lip member by a slender ligament 45, 46 to enable the lips to be yieldably deflected toward and away from the flanks 3g and 3h of the tongue. An additional set of bolts 47, 48 on each side of the nozzle is provided to control the outer lips 43 and 44.

Each of the bolts 47, 48 has a respective cylindrical neck 49, 50 rotatably received in the collar assemblies 50', 51, which are split as previously described. The collar assemblies are sandwiched between the circular flanges 52, 53 of these bolts 32, 33, may be rotated by a wrench to deflect the lips.

Thus, the lips 17 and 18 may be used to adjust the width of the outer channels 13 and 14 defined between these lips and the converging faces 43a and 44a of the lips 23 and 24. Similarly, the lips 23 and 24 (FIG. 3) may be deflected individually and independently of one another to adjust the width of the gap 20 or 21 formed between each of these lips and the flanks 3g and 3h.

The outer channels 13 and 14, respectively, merge with the inner channels 15 and 16 just downstream of the lips 17 and 18 in the trunk channels 20 and 21. The trunk channels 20 and 21, in turn, merge in a discharge slot 22, forming the nozzle outlet 19.

As noted earlier, an essential feature of this invention is the provision of a gap width $a$ for the outer elongated slot-like channels 13 and 14 which is substantially less than the gap width $b$ of the slot-like inner channels 15 and 16.

In the embodiment as illustrated in FIG. 3, the width $a$ of the outer channels is approximately half the width $b$ of the inner channels. The width $c$ of each of the trunk channels is adjusted by the lips 23, 24 and is here shown to have a width which may be considered the sum $c = a + b$. However, the width $c$ may be greater than or less than $a + b$.

As has been pointed out above, my invention is based upon the discovery that, under the conditions illustrated, adjustment of the width $a$ of the outer channels 13 and 14 by the lips 17 and 18 will not necessarily alter the thickness of the inner layer thereby formed. Referring now to FIG. 4, it can be seen that a first synthetic resin material $M_1$ is supplied from the chamber 7 to the inner channel 13 which here is adjusted to have a width $a - \Delta a$ or a width slightly less than its normal or mean width. The result is the formation of a layer A of thermoplastic having a thickness less than the normal thickness of this layer in the mean position of the lip 17. Most surprisingly, this adjustment of lip 17, while in fact modifying the gap $b$ slightly as represented at $b'$, does not affect the thickness of the layer B underlying the layer A and deriving from thermoplastic material forced through the inner channel 15. In this case the gap width $c'$ remains since the lip 23 has not been adjusted.

However, on the other side of the tongue 3c, the width of the outer channel 14 has been increased ($a + \Delta a$) with a concomitant slight decrease in the width $b - \Delta b$ of the inner channel 16. Here again the outer layer D has a modified thickness (increased) by comparison with the thickness of this layer in the mean position of the inner lip 18. Moreover, the outer lip 24 has here been adjusted to reduce the width of the trunk channel 21 to a value $c - \Delta c$ without materially changing the thickness of layer D but with adjustment of the thickness of layer C.

I claim:

1. A band-producing nozzle comprising a nozzle body formed with an elongated discharge slot, a tongue having a stationary surface within said body leading toward said slot, an inner lip resiliently deflectable in said body and having a first face confronting said surface for defining therewith an inner channel leading toward said slot, a second face defining in said body an outer channel merging with said inner channel ahead of said lip, said slot communicating with said channels upon their merger, and an outer lip ahead of said inner lip in the direction of flow of said material toward said slot, said tongue defining with said outer lip a narrow trunk channel communicating with said inner and outer channels ahead of said inner lip and opening into said slot, said outer lip being resiliently deflectable toward and away from said tongue to adjust the width of said trunk channel, said inner lip having a mean position wherein said outer channel has a smaller width than said inner channel;

means for feeding extrudable material through said inner channel and through said outer channel to form respective layers upon passage of the material through said slot;

first adjusting means for adjusting the thickness of the layers emerging from said outer channel and including adjusting means for resiliently deflecting said inner lip; and second adjusting means operable independently of the first-mentioned adjusting means for deflecting said outer lip, said tongue lying generally in a plane parallel to said slot and terminating in a wedge-shaped apex rearwardly of said slot, said lip being deflectable toward and away from said tongue, a respective set of said inner and outer channels, trunk channel, inner and outer lips and first and second adjusting means being provided on opposite sides of said tongue, the trunk channels on opposite sides of said tongue merging in the direction of said slot and adjacent the latter.

2. The nozzle defined in claim 1 wherein each of said adjusting means includes a respective set of bolts threaded into the respective lips for deflecting same.

References Cited

UNITED STATES PATENTS

| | | |
|---|---|---|
| 2,761,417 | 9/1956 | Russell et al. |
| 2,998,624 | 9/1961 | Ricketts _____ 18—12 |
| 3,096,543 | 7/1963 | Konopacke et al. _____ 18—12 |
| 3,222,721 | 12/1965 | Reynolds _____ 264—174 |
| 3,464,087 | 9/1969 | Koch _____ 18—12 |
| 3,480,998 | 12/1969 | Von Erdberg _____ 18—12 |

FOREIGN PATENTS

| | | |
|---|---|---|
| 245,792 | 3/1966 | Austria. |
| 1,090,469 | 11/1967 | Great Britain. |

J. SPENCER OVERHOLSER, Primary Examiner

M. O. SUTTON, Assistant Examiner

U.S. Cl. X.R.

18—12 DS; 264—172